Jan. 12, 1954  J. O. P. HUGHES  2,665,788
SPLINED CLUTCH
Filed Oct. 9, 1951  4 Sheets-Sheet 1
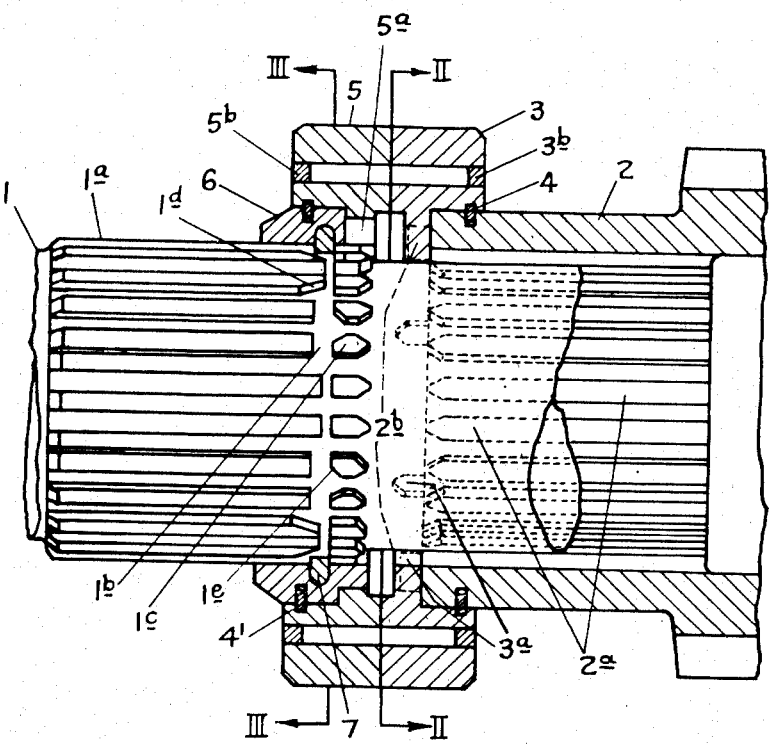
FIG.1.
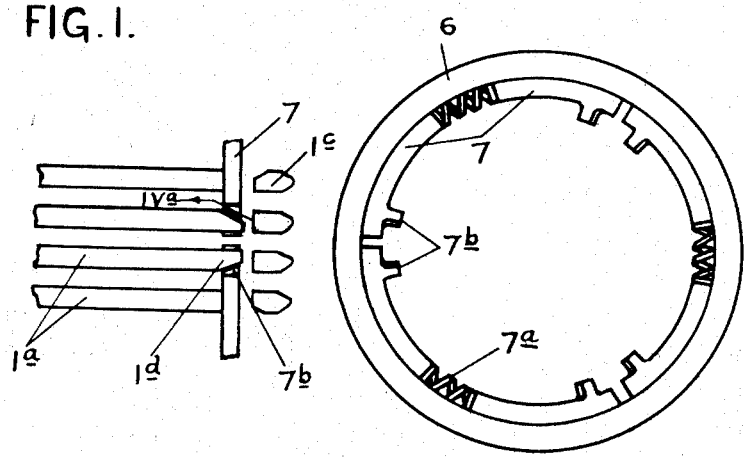
FIG.4ª.
FIG.3ª.
Inventor:
John O. P. Hughes
By Babcock & Babcock
Attorney.

Jan. 12, 1954     J. O. P. HUGHES     2,665,788
SPLINED CLUTCH

Filed Oct. 9, 1951     4 Sheets-Sheet 2

Inventor
John O. P. Hughes
By Babcock & Babcock
Attorneys

Jan. 12, 1954 J. O. P. HUGHES 2,665,788
SPLINED CLUTCH
Filed Oct. 9, 1951 4 Sheets-Sheet 3
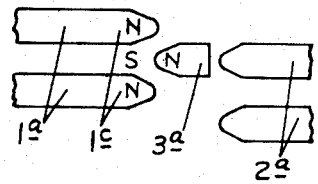
FIG. 5ª.
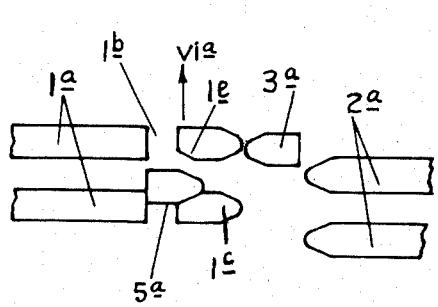
FIG. 6ᵇ.
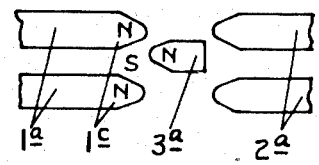
FIG. 5ᵇ.
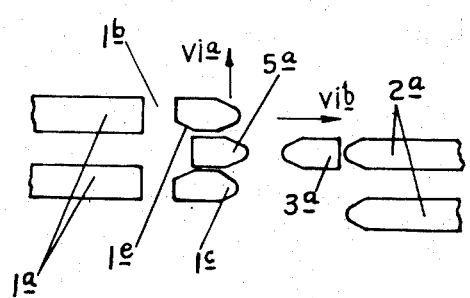
FIG. 6ª.
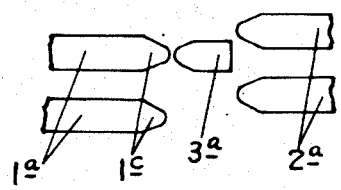
FIG. 5ᶜ.
Inventor:
John O. P. Hughes
By Babcock & Babcock
Attorneys Jan. 12, 1954　　　　J. O. P. HUGHES　　　　2,665,788
SPLINED CLUTCH Filed Oct. 9, 1951　　　　　　　　　　　　4 Sheets—Sheet 4

Inventor:
John O. P. Hughes
By Babcock & Babcock
　　　　Attorneys

Patented Jan. 12, 1954

2,665,788

UNITED STATES PATENT OFFICE 2,665,788

SPLINED CLUTCH

John Oliver Philip Hughes, Rugby, England, assignor to The English Electric Company Limited, London, England, a British company Application October 9, 1951, Serial No. 250,507

Claims priority, application Great Britain
October 13, 1950

10 Claims. (Cl. 192—12)

The invention relates to clutches for engaging and disengaging two coaxial main splined members which are axially slidable relatively to one another.

Such clutches are applicable for example to constant mesh reverse gears in which a driving shaft is to be brought from a neutral position into alternative engagement with two gears in order to drive an output shaft in opposite directions.

Splined clutches occupy a small space only and are capable of being run at very high shaft speeds. Their design is simple and they are reliable in operation; they require small forces for engagement and disengagement so that they can be manually operated even for high shaft power and do not require fluid pressure or servo-motors for their operation. These well known advantages of splined clutches have hitherto been offset by the following difficulties:

Splined clutches can be engaged in relative positions only of the two splined members in which the ridges of one member are in juxtaposition to the grooves of the other member, and in no other relative position.

Attempts to engage a splined clutch while either the driven or the driving member is in motion may result in permanent damage to the splines.

Accordingly a slip coupling, such as a hydraulic or friction clutch had to be inserted between the prime mover and the splined clutch, which slip coupling had to be capable of transmitting the full torque and was therefore heavy, bulky, expensive, etc., whereby most of the above advantages of the splined coupling were offset.

It is the main object of the invention to provide a splined clutch which retains the main advantages of its type while obviating most of its disadvantages.

According to a main feature of the invention a first auxiliary member is coupled with limited rotational freedom to one of the said main splined members and carries a series of magnets the alternating N- and S-poles of which are disposed at half the pitch of the spline of the said main splined members, and which co-operates with a second auxiliary member coupled for rotation with the second main splined member and carrying a corresponding series of magnets, whereby the said first auxiliary member is turned by magnetic attraction and repulsion into a position in which its inward projections form a guide for the chamfered edges of the splines of the said second main splined member into an engageable position relative to the chamfered edges of the splines of the said first main splined member, the torque for turning the said main splined members relative to one another into engageable positions being derived from the axial force for shifting them into engagement owing to wedge action of the said inward projections and chamfered splines on one another, and not from the aforesaid magnetic repulsion and attraction.

The latter can accordingly be provided by permanent magnets whereby the complication and current consumption of electro-magnets is obviated.

According to a development of the invention, baulking means are provided for preventing the engagement of the two main splined members while they are rotating, however slowly relative to one another. Preferably the same components as required for bringing the two splined members into an engageable position are used as these baulking means.

A splined coupling according to the invention is particularly suitable in cases where one of the main splined members cannot be rotated prior to engagement while the other main splined member can be rotated. This condition prevails for example in a road roller, in a rolling mill, or in a gas turbine driven locomotive wherein two mechanically independent turbines are provided, one of which (the "charging turbine") drives the compressor, and the other one (the "power turbine") drives the locomotive mechanically.

In the latter case, the rotor of the power turbine can be easily turned while the locomotive is held stationary by means of its wheel brakes and while the charging turbine is idling. However, if left to itself, the rotor of the power turbine would also rotate at an idling speed under the torque of the exhaust gases from the compressor turbine with which it is in series flow connection. The rotor of the power turbine has therefore to be restrained from idling while being allowed a small angular adjustment as required for its shaft engaging the splined clutch. A spring balanced brake can for example be used for this purpose, the spring of which is sufficiently strong to balance the said torque, but which has a sufficiently flat characteristic to allow the said brake to be turned together with the rotor of the power turbine a small angle from the equilibrium position in either direction, as required for engaging the splined coupling. When the brake is applied, the spring will be wound up by the kinetic energy of the idling power turbine rotor, until it reaches a stop. The brake with the power turbine gripped in it will then return to an equilibrium position in which the torque of the spring is just balanced by the torque exerted by the exhaust gases of the charging turbine on the power turbine rotor.

Spring balanced brakes for returning a prime mover in the reverse direction have been suggested in other connections and no claim will be made for spring balanced brakes as such or in the connections as suggested prior to the present patent application.

In order that the invention may be better understood, an embodiment thereof will now be described by way of example with reference to the accompanying drawings, in which:

Fig. 1 is an axial section through the splined coupling in a position preceding engagement.

Figure 2:
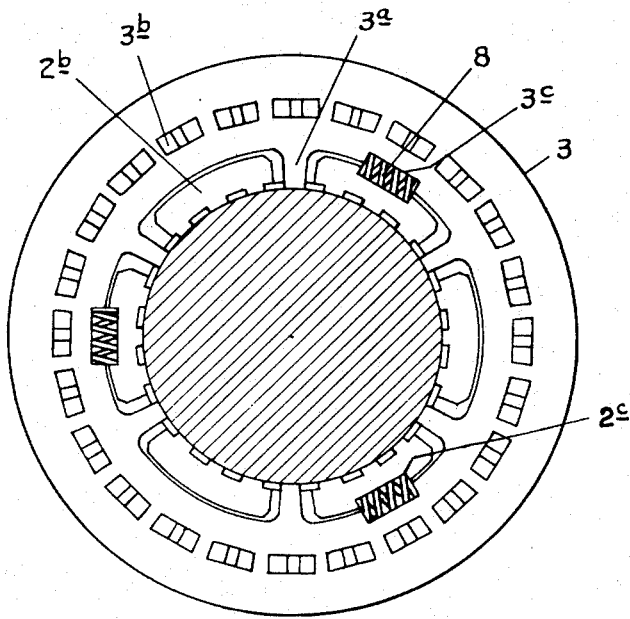
Fig. 2 is a transverse section along the line II—II of Fig. 1.
Figures 3, 4:
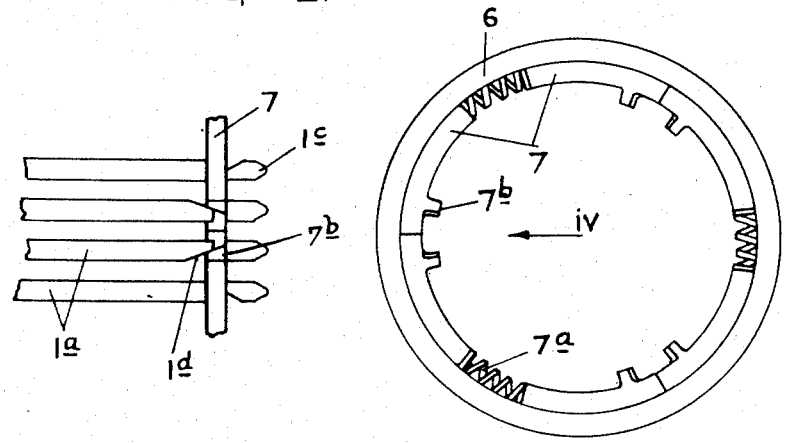
Fig. 3 is a transverse part section along the line III—III of Fig. 1;
III—III of Fig. 1.
Fig. 4 is a part view in the direction of the arrow IV of Fig. 3.
Figure 7:
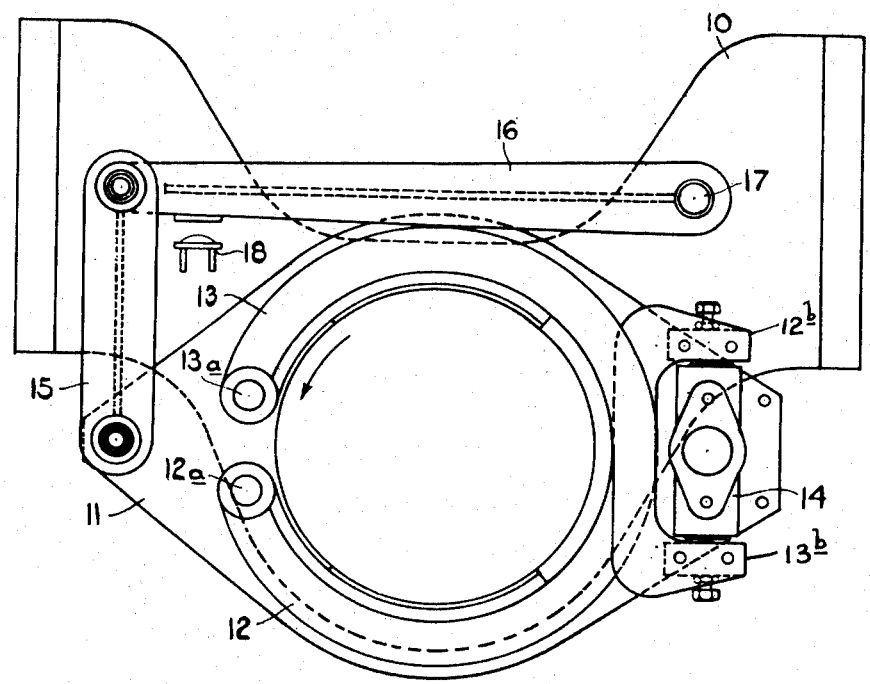

Figs. 3a and 4a correspond to Figs. 3 and 4, respectively, but show the parts in a different position, Figs. 5a, b, c, show diagrammatically a pair of spline ridges of each of the two main splined members in three different relative positions with the auxiliary splined members guiding them into engagement indicated, but with the baulking means omitted for clarity, Figs. 6a and b show diagrammatically a pair of spline ridges of each of the two main splined members, the auxiliary splined member and the baulking means in two different poistions, and Fig. 7 shows a frontal view of the spring balanced brake.

Referring first to Figs. 1-6, the driving shaft 1 is provided with spline ridges 1a the ends of which adjacent the driven member 2 are separated by a circular groove 1b into a ring of ridge ends 1c which are also integral with the shaft 1. These ends 1c are all chamfered towards the driven member 2, and some are also chamfered at 1e towards the main ridges 1a, some of which are chamfered at 1d, as will be explained later. The driven member 2 is internally provided with splines 2a which are complementary to the splines 1a, 1c of the driving shaft 1. The driven member 2 is assumed to be restrained from moving in the axial direction altogether, and prior to engagement with the driving member 1, also from rotating. The driving member 1 is assumed to be axially shiftable for the purpose of engaging and disengaging the coupling, and also to be capable of an angular movement of at least half the pitch angle of the splines in either direction together with a spring loaded brake (Fig. 7).

An auxiliary splined member 3 (which will be referred to as the "pilot ring") is arranged on the driven member 2 in such a manner that it is restrained in the axial direction by a circular clip 4 but has an angular freedom of adjustment relative to the driven member 2 within the limits defined by the play between inward radial teeth 3a of the pilot ring 3 (Fig. 2) and axial projections 2b of the driven member 2. Compression springs 8 are arranged half in recesses 2c on the outer periphery of the projections 2b and half in recess 3c in the inner circumference of the pilot ring 3 so as to have a centering effect on these parts in both directions, i. e. to prevent the said projections 2b from coming to rest in a position abutting on the teeth 3a.

These inward projecting teeth 3a are complementary to the grooves between the splines 1a, 1c of the driving shaft 1 but can be fewer in numbers since they have not to transmit the driving torque. For example twenty-four splines can be arranged on the driving shaft 1 and on the driven member 2, while only six teeth 3a are provided on the pilot ring 3.

Twenty-four horse shoe permanent magnets 3b are arranged in a circle on the pilot ring 3 with their magnet poles alternating in polarity and facing towards another ring 5 carrying likewise twenty-four horse shoe permanent magnets 5b in juxtaposition to the magnets 3b, the rings 3 and 5 being of nonmagnetic material, at least in the range of the magnets. Preferably the ring 5 is identical in shape with the pilot ring 3, and merely reversed into a symmetrical position. This ring 5 will be referred to as the "baulk ring" for a reason which will become apparent later.

The baulk ring 5 is mounted on an internally splined ring 6 which will be referred to as the "baulk ring hub" and is restrained in the axial direction relative to this hub 6 by a circular clip 4' corresponding to the circular clip 4 of the pilot ring 3.

The baulk ring hub 6 has twenty-four internal splines engaging the splines 1a of the driving shaft 1 so as to be slidable on this shaft. In an internal circular groove of the baulk ring hub 6 a latch ring 7 is arranged, which consists of six separate segments which normally abut against one another (Figs. 3 and 4) in pairs, with compression springs 7a interposed between adjacent members of different pairs. Near the abutting faces each segment has a chamfered internal projection 7b capable of engaging a groove between the spline ridges 1a of the shaft 1. These projections 7b are chamfered as shown in Fig. 4 corresponding to the chamfered ends 1d of their opposite spline ridges 1a.

When the shaft 1 is moved axially with respect to the latch ring 7 these chamfered ends 1d force the chamfered projections 7b apart as shown in Figs. 3a and 4a against the action of the compression springs 7a, so as to guide the projections 7b into the grooves between the ridges 1a as indicated by the arrow IVa in Fig. 4a whereby the shaft 1 can be shifted through the latch ring 7 and into engagement with the driven member 2, provided both the shaft 1 and the member 2 are stationary. It will later be shown how such engagement is prevented if the two main splined members 1, 2 are in rotation relative to one another.

Assuming the two main splined members to be stationary, the latch ring 7 does not come into effect any further, and has therefore been omitted from the diagrammatic Figs. 5a to 5c which will now be referred to.

It is assumed in Figs. 5a, b, c that the north poles of the magnets 3b, 5b are arranged over the spline ridges 1a, 2a, respectively, and the south poles over the grooves.

In Fig. 5a the splines 1a and 2a of the two main splined members are shown in an engageable position. The pilot ring 3 is in a centered position with respect to the driven member 2 in which the compression springs 8 (Fig. 2) are released (except for any possible preloading), and the teeth 3a of the pilot ring 3 are in alignment with the spline ridges 2a of the driven member. In this position the north poles of the horse shoe magnets 3b of the pilot ring 3 are opposite the south poles of the horse shoe magnets 5b of the baulk ring 5, i. e. in a magnetic equilibrium position.

If these conditions prevail when the splined coupling is to be engaged, the engagement can be smoothly performed by applying a shifting force on the shaft 1.

However, the splines 1a and 2a may be in the relative position as shown in Fig. 5b (or in any position intermediate those of Figs. 5a and 5b). In this case the north poles of the magnets 5b of the baulk ring 5 would be still over the ridges 1a because in a state of rest of the two main splined members 1, 2 relative to one another the teeth 5a (Fig. 1) of the baulk ring are always in engagement with the grooves between the ridges 1a which excludes any relative angular movement between the baulk ring 5 and the shaft 1. The north poles of the magnets 5b would however, then be opposite the north poles of the magnets 3b of the pilot ring 3, and would by magnetic repulsion angularly deflect the pilot ring 3 into the position indicated in Fig. 5b where the tooth 3a is in juxtaposition to the groove between the spline ridges 1a of the driving shaft. The centering springs 8 are thereby compressed between the shoulders of the recesses 2c and 3c, respectively.

If now the axial movement of the driving shaft 1 towards the driven member 2 is continued, the chamfered faces of the ends 1c engage the chamfered teeth 3a of the pilot ring 3. This ring can not give way angularly because of its teeth 3a abutting against the side faces of the projections 2b of the driven member 2 so that by reaction a torque is exerted on the shaft 1 which moves the latter towards the engageable position of Fig. 5a. The pilot ring 3, too, returns to the position of Fig. 5a by the lead-in on the chamfered ends of the shaft splines. Engagement can accordingly be effected.

Fig. 5c shows the importance of a centering force preventing the pilot ring 3 from coming to rest in a position in which its internal teeth 3a are off-set from the spline ridges 2a of the driven member, where they would baulk an otherwise engageable position of the splines 1a and 2a relative to one another.

When the magnets 5b are approaching the magnets 3b of the pilot ring 3 axially from a distant position in which they are in the neutral position of the coupling, these magnets 5b of the baulk ring might then be in a relative angular position in which the magnetic torque would force the pilot ring 3 to stay in the position of Fig. 5c i. e. with the teeth 3a abutting on the projections 2b. There would then be no possibility of the pilot ring leaving the position of Fig. 5c in which it baulks an otherwise engageable position of the splines 1a and 2a.

Accordingly the centering springs 8 are provided which are compressed between a shoulder of the recess 2c in the projections 2b and a shoulder of the recess 3c in the pilot ring 3 in whichever direction the pilot ring 3 is angularly deflected relative to the driven member 2. Thereby the pilot ring is brought back into the position of Fig. 2 where it has the angular freedom in both directions required for its guiding action described hereinabove with reference to Figs. 5b and 5a.

Assuming now the two main splined members 1 and 2 to be in relative rotation, e. g. the gear wheel 2 to be arrested by the locomotive brakes through the main locomotive reduction gearing while the shaft 1 idles with the rotor of the power gas turbine, or the locomotive rolling with the power gas turbine stationary, or both the locomotive and the gas turbine moving, but not at a co-ordinated speed. This is indicated in Figs. 6a and 6b by an arrow VIa pointing out the circumferential direction of the movement of the splines 1a, 1c relative to the stationary splines 2a. The teeth 5a of the baulk ring lie in grooves between the ends 1c of ridges 1a (Fig. 6a).

If now the shaft 1 is shifted further towards the gear 2 in the direction of the arrow VIb, the baulk ring 5 abuts against the pilot ring 3 and cannot therefore join the continued axial movement of the shaft 1. Being left behind in an axial direction relative to the shaft 1 and being braked by frictional contact with the pilot ring 3, the baulk ring 5 gets into the position shown in Fig. 6b where its teeth 5a engage with their blunt rear faces the blunt ends of the main spline ridges 1a in the groove 1b between these ridges 1a and their separate ends 1c. Thereby the teeth 5a act as stops baulking any further axial movement of the shaft 1 towards the gear 2.

The chamfered ends 1d of the main spline ridges 1a push the inward radial projections 7b of the latch ring 7 from the position of Figs. 3 and 4 through the position of Figs. 3a and 4a in the direction of the arrow IVa, i. e. into the grooves between the splines 1a when engagement of the clutch is possible, so that the shaft 1 can slide through the latch ring 7 and through the baulk ring hub 6.

However, when engagement is baulked because of relative rotation of the two main splined members 1, 2 as described with reference to Figs. 6a, b, the chamfered ends 1d do not penetrate deeper between the projections 7b than shown in Fig. 4a. Accordingly the compressed springs 7a push the shaft 1 back by wedge action between the chamfered faces of the ends 1d and of the projections 7b, until the position of Figs. 3 and 4, i. e. a fully disengaged condition of the coupling is reached.

The operator who will have noticed the false start will then bring the turbine rotor to a standstill by applying the spring balanced brake (Fig. 7) so that engagement of the coupling can be effected as described with reference to Figs. 5a and 5b.

It will be noted that, when disengaging the splined coupling, the latch ring 7 is carried along in an axial direction by the rear faces of the ends 1c abutting against the blunt forward faces of the projections 7b (Fig. 4). This resets the device to the correct position on the shaft. The axial force applied to the shaft 1 will have to be large enough to overcome also the magnetic attraction between the magnets 5b of the baulking ring 5 and the magnets 3b of the pilot ring 3.

Owing to the fact that the splined clutch according to the invention can be engaged in any relative position of the two main splined members, provided they are at a standstill relative to one another, a slip coupling such as a friction clutch can be dispensed with for prime movers which are capable of giving the required torque from standstill and at low speed, such as a gas turbine having a mechanically independent power turbine rotor.

In the case e. g. of a reversible gear the coupling will have to be symmetrically duplicated. A movement of the shaft 1 from the neutral position to the left hand side in Fig. 1 to the same extent will then be necessary to engage the reverse gear, as the movement to the right hand side required to bring the splines 1a into full engagement with the splines 2a.

Referring now to Fig. 7, on a member 10 of the fixed frame of the machine comprising the splined clutch according to the invention, such as the main frame of a gas turbine driven locomotive, the back plate 11 of the brake is journalled with rotational freedom about the axis of rotation of the main driving shaft, say the shaft of the power turbine rotor (not shown).

On this back plate 11, two brake shoes 12 and 13 are hinged at 12a and 13a, respectively, the free ends 12b and 13b of which shoes cross over, and are spaced apart by an expander 14 of any known type. Accordingly, by expanding the said expander 14, the operator would apply the brake shoes 12, 13 to a brake drum (not shown) on the power turbine rotor shaft.

The back plate 11 is linked by a link 15 to a lever arm 16 connected to one end of a torsion bar 17, the other end of which is fixed to the frame member 10.

Accordingly, when the back plate 11 is carried along rotationally through a certain angle by the inertia of the power turbine rotor when the brake is applied, the torsion bar 17 is twisted by the linkage 15, 16 until the same reaches a stop 18.

The energy thus stored in the torsion bar 17 suffices to turn the back plate 11 together with the whole brake and with the rotor held by the same, into an equilibrium position in which the spring force of the torsion bar 17 statically balances the torque permanently applied to the power turbine rotor by the exhaust gases from the idling charging turbine supposed to be in series flow connection with the power turbine.

The spring characteristic of the torsion bar 17 and the leverage of the linkage 15, 16 are so chosen that the torque applied on the male member of the splined clutch by the operator trying to engage the same, owing to the wedge action of the chamfered edges described hereinabove, suffices for turning the whole rotor-brake assembly through the required small angle in either direction.

While I have described hereinabove what may be considered a typical and useful embodiment of my said invention, I wish it to be understood that I do not limit myself to the exact details and dimensions disclosed, for obvious modifications will occur to a person skilled in the art, according to the circumstances in which my invention is to be applied.

What I claim as my invention and desire to secure by Letters Patent is:

1. A clutch comprising in combination: two co-axial main splined members slidable in and out of one another, a first auxiliary member coupled with limited rotational freedom to one of the said main splined members, a series of magnets having alternating N- and S-poles arranged on the said first auxiliary member at half the pitch of the splining of the said main splined members, a second auxiliary member coupled for rotation with the said second main splined member, a series of magnets having alternating N- and S-poles arranged at the same pitch and opposite those of the said first auxiliary member, the said main splined members having splines chamfered at the ends facing one another prior to engagement thereof, and the said first auxiliary member having radial inward projections chamfered towards the ends of the splines of the said second main splined members and guiding the same into engageable position with the ends of the said first main splined members, the torque turning the said first auxiliary member into the said guiding position being derived from the magnetic attraction and repulsion of the said two sets of magnets, and the torque for turning the said main splined members into engageable position being derived from the axial force shifting the same into engagement owing to wedge action of the said inward projections and chambered splines.

2. A clutch as claimed in claim 1 wherein the said magnets of both auxiliary members are permanent magnets.

3. A clutch as claimed in claim 1 wherein the said two auxiliary members are of identical shape, facing one another with the pole faces of their respective magnets.

4. A clutch as claimed in claim 1 comprising in addition: axial projections from the said female splined member projecting with rotational clearance between the said radial inward projections of the said first auxiliary member.

5. A clutch as claimed in claim 1 comprising in addition: resilient means biassing the said radial inward projections of the said first auxiliary member rotationally into juxtaposition with splines of the said female splined member.

6. A clutch as claimed in claim 5 wherein the said resilient means comprise helical compression springs arranged tangentially and abutting with one part of the circumferences of their end faces on radial shoulders of the said first auxiliary member and with another part of these circumferences on radial shoulders of the said female splined member.

7. A clutch comprising in combination: a male splined member and a female splined member co-axially slidable in and out of one another both having splines chamfered at their ends facing those of the other, a pilot ring coupled with limited rotational freedom to the said female splined member, radial inward projections on the said pilot ring chamfered towards the spline ends of the said male splined member, a series of magnets having alternating N- and S-poles arranged on the said pilot ring at half the pitch of the splines of the said male and female splined members, baulking means coupled with limited rotational freedom to the said male splined member, radial inward projections on the said baulking means, a series of magnets having alternating N- and S-poles arranged on said baulking means at the same pitch and opposite those of the said pilot ring, the said pilot ring guiding the splines of the said male splined member into the grooves between the splines of the said female splined member in the condition of rotational rest of the said two splined members relative to one another, and the said baulking means in the condition of rotation of the said two splined members relative to one another being turned by frictional contact with the said pilot ring into a position baulking with its radial inward projections the axial approach of the said male and female splined members relative to one another.

8. A clutch comprising in combination: a male splined member and a female splined member co-axially slidable in and out of one another both having splines chamfered at their ends facing those of the other, a pilot ring coupled with limited rotational freedom to the said female splined member, radial inward projections on the said pilot ring chamfered towards the spline ends of the said male splined member, a series of magnets having alternating N- and S-poles arranged on the said pilot ring at half the pitch of the splines of the said male and female splined members, a baulking ring hub slidable over the tops of the splines of the said male splined member and having an internal circular groove, pairs of segments circumferentially slidable in the said groove, compression spring arranged in said groove between adjacent pairs biassing the segments of each pair towards one another, each segment having a tooth of a circumferential dimension fitting between adjacent splines of the said male splined member and of an axial dimension fitting into a recess provided in some such splines near the ends thereof facing the female splined member, the said teeth being chamfered and in sliding contact with inner chamfered faces of other such splines of the said male splined member near the ends thereof facing the female splined member, and a baulk ring rotatably arranged on the said baulk ring hub identical in shape with the said pilot ring and facing the series of magnets of the latter with its own series of magnets, and when abutting on the latter in a state of rotation of the said male and female splined members relative to one another being turned relative to the said baulk ring hub by frictional contact with the said pilot ring, and with its radial inward projections entering into the said recesses in the splines of the said male member and with blunt ends facing blunt inner ends of said splines baulking the axial approach of the said male and female splined members towards engagement.

9. A clutch comprising in combination: two co-axial main splined members slidable in and out of one another, the first one of them being rotatable and the second one immobilised prior to engagement of the clutch, a first auxiliary member coupled with limited rotational freedom to one of the said main splined members, a series of magnets having alternating N- and S-poles arranged on the said first auxiliary member at half the pitch of the splining of the said main splined members, a second auxiliary member coupled for rotation with the said second main splined member, a series of magnets having alternating N- and S-poles arranged at the same pitch and opposite those of the said first auxiliary member, the said main splined members having splines chamfered at the ends facing one another prior to engagement thereof, and the said first auxiliary member having radial inward projections chamfered towards the ends of the splines of the said second main splined member and guiding the same into engageable position with the ends of the said first main splined member, the torque turning the said first auxiliary member into the said guiding position being derived from the magnetic attraction and repulsion of the said two sets of magnets, and the torque for turning the said main splined members into engageable position being derived from the axial force shifting the same into engagement owing to wedge action of the said inward projections and chamfered splines, a brake in operable relationship to the said first main splined member and having a limited freedom of rotation about the axis thereof, and biassing means applying a torque to the said brake opposing the torque applied by the said first main splined member by the said brake and allowing the slight rotational adjustment owing to wedge action of the engaging axial force required for guiding the said first main splined member into the said second main splined member.

10. A clutch as claimed in claim 9 comprising a fixed stop member and wherein the said biassing means are spring means having a force and characteristic allowing themselves to be wound up by the kinetic energy inherent in the rotating first main splined member up to abutting of the said brake on the said fixed stop member, and to return the said brake to an equilibrium position balancing statically the torque continually applied to the said first main splined member in the braked condition.

JOHN OLIVER PHILIP HUGHES.

References Cited in the file of this patent

FOREIGN PATENTS

| Number | Country | Date |
|---|---|---|
| 126,855 | Germany | Feb. 25, 1932 |